Aug. 17, 1965

F. D. WERNER ETAL 3,201,575

LINEARIZING MULTI-CHANNEL DIGITIZER

Filed July 7, 1960

INVENTORS
FRANK D. WERNER
EARL A. GRINDHEIM
BYRON O. SADLER
BY
Dugger & Johnson
ATTORNEYS

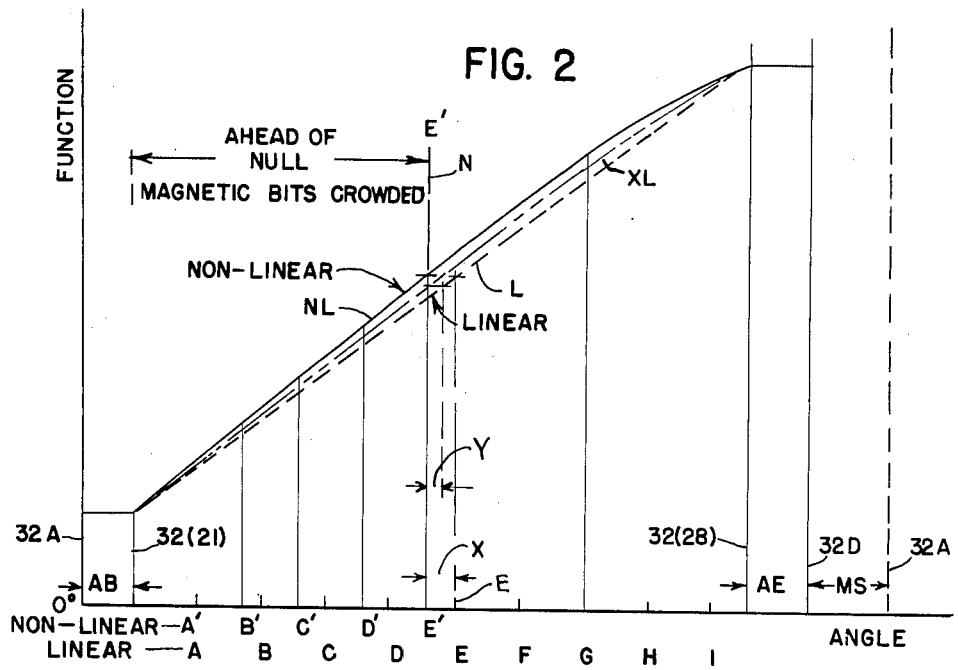
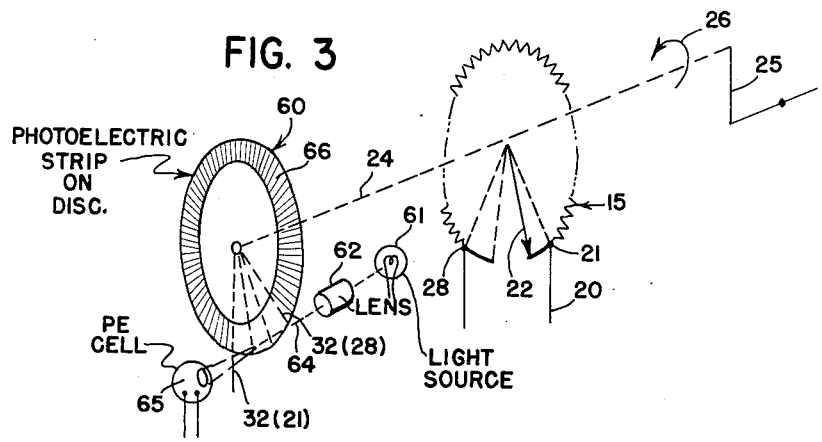

Aug. 17, 1965

F. D. WERNER ETAL 3,201,575

LINEARIZING MULTI-CHANNEL DIGITIZER

Filed July 7, 1960

INVENTORS
FRANK D. WERNER
EARL A. GRINDHEIM
BYRON L. SADLER
BY

Dugger & Johnson

ATTORNEYS

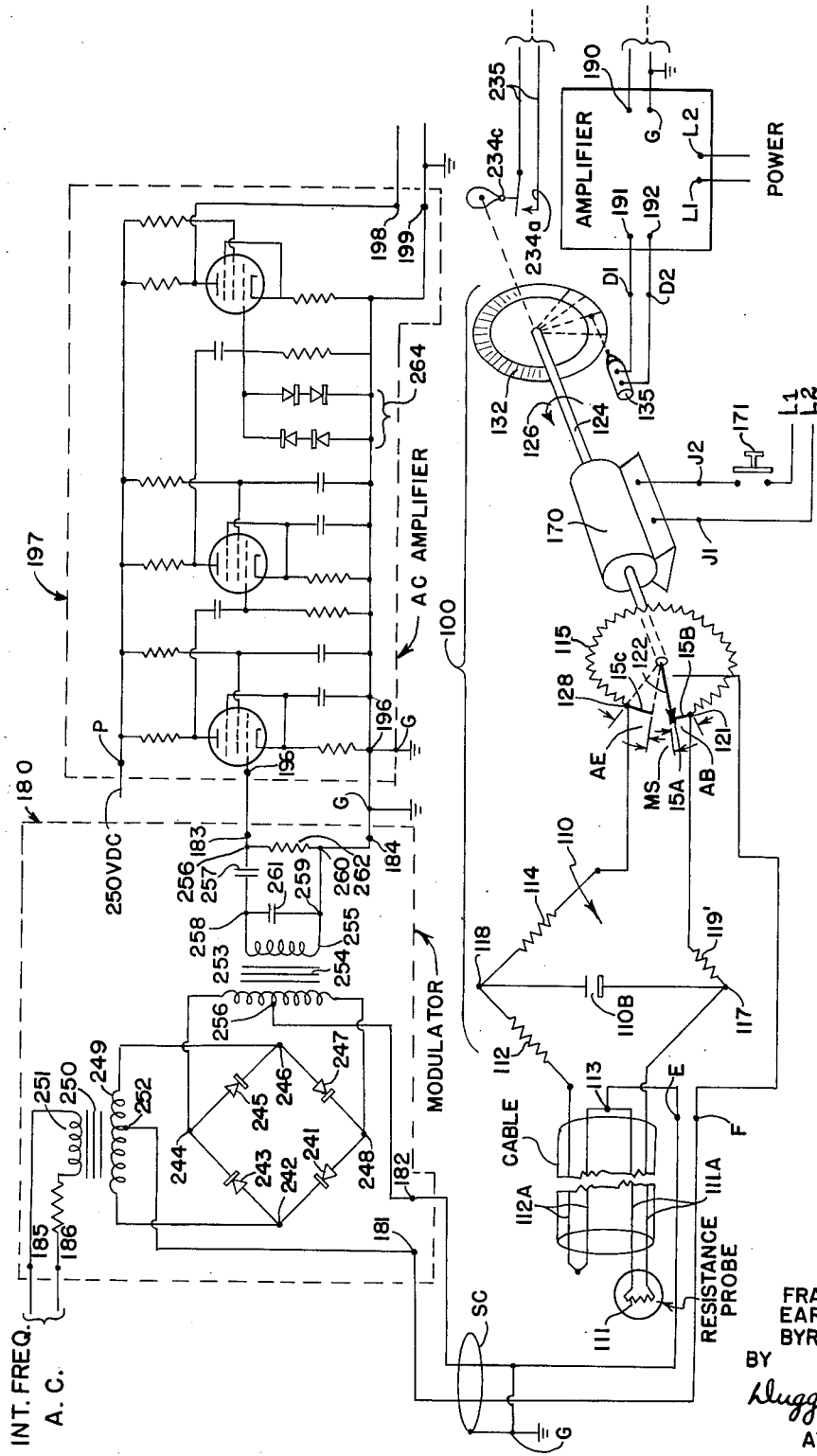

Aug. 17, 1965    F. D. WERNER ETAL    3,201,575
LINEARIZING MULTI-CHANNEL DIGITIZER
Filed July 7, 1960    7 Sheets-Sheet 5

INVENTORS
FRANK D. WERNER
EARL A. GRINDHEIM
BYRON L. SADLER
BY
Dugger & Johnson
ATTORNEYS

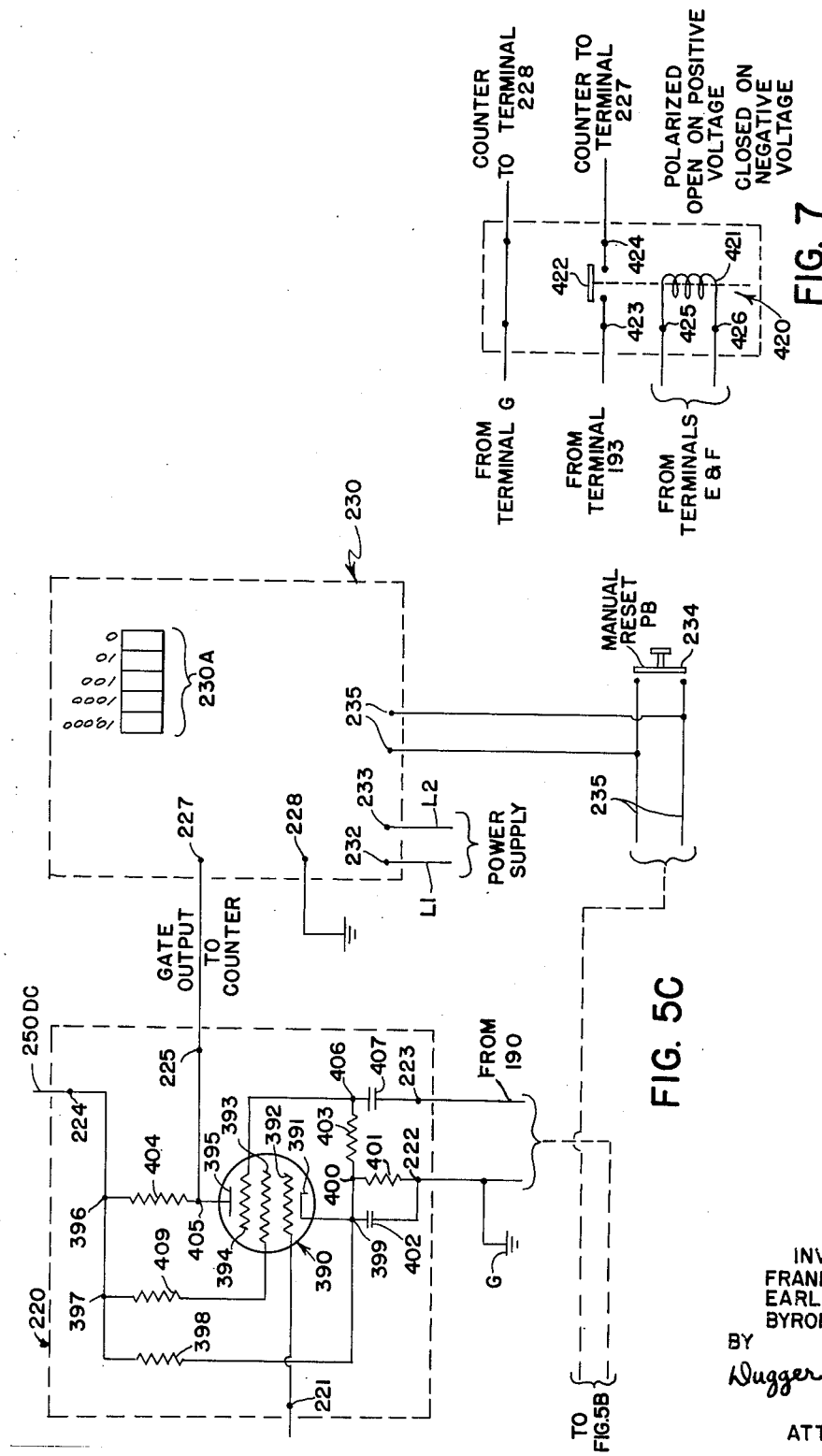

INVENTORS
FRANK D. WERNER
EARL A. GRINDHEIM
BYRON L. SADLER
BY
Dugger & Johnson
ATTORNEYS

United States Patent Office 3,201,575
Patented Aug. 17, 1965

3,201,575
LINEARIZING MULTI-CHANNEL DIGITIZER
Frank D. Werner, Earl A. Grindheim, and Byron L. Sadler, all of Minneapolis, Minn., assignors to Rosemount Engineering Company, Minneapolis, Minn., a corporation of Minnesota
Filed July 7, 1960, Ser. No. 41,301
2 Claims. (Cl. 235—197)

This invention relates to apparatus for providing a digital output signal for any function, which may vary according to a prescribed relationship in respect to another function. More specifically, the invention provides apparatus for displaying a digital total corresponding to the values of an unknown function by reference to another function. According to certain aspects of the invention, it provides apparatus for providing a linearized digital output corresponding to a non-linear function or vice versa. It is an object of the invention to provide apparatus for the aforesaid purposes.

In many instances in industry and the sciences, responsive devices are provided which have certain inherent errors, and up to the present time, such errors have had to be tolerated because nothing could be done about it. For example, in the ordinary resistance temperature indicator, a resistance element is provided, the resistant value of which varies according to the temperature to which the element is subjected. It would be ideal if the graph of resistance values plotted against temperature should be a straight line, but this is not true for any material or substance. Thus, an ordinary platinum resistance thermometer has a resistance versus temperature curve which is not a straight line. When such inherent non-linear responsive device is used as the basis of an original signal, all devices dependent upon such signal must be calibrated so as to take into account the non-linearity of the underlying responsive element, namely the non-linear resistance element.

Likewise read-out apparatus, of the most precise types, generally "read" the resistance of the responsive device (such as a resistance element thermometer) in a bridge circuit, and this requires external adjustable resistances, usually a potentiometer instrument, for providing a "null voltage" in the read-out circuit. This circumstance introduces certain additional errors, since the potentiometer, like the resistance thermometer, is again an element having a non-linear function. This therefore introduces additional errors which must be acknowledged in the subsequently responsive apparatus. Also, where any rotary devices are involved, such as the rotary element on a potentiometer, errors may be introduced due to the lack of concentricity between the axis of the rotary element and the (stationary) resistance element of the potentiometer.

It is thus evident that even when utilizing the best equipment available, the ultimate signal yielded by, for example, a resistance thermometer and read-out circuit, will bear a non-linear relation in respect to the temperature that is being sensed.

The same facts hold true in respect to other sensing devices for voltage, speed, or any of a wide variety of factors which may be desired to be sensed, since in final analysis there is almost invariably some device which is non-linear in respect to the function being sensed, or because the read-out circuits contain error producing elements which may introduce a factor of non-linearity in the ultimate output signal.

In some instances it is desired that a signal be provided which bears in non-linear relationship to either a linear or non-linear input signal. This requires some functional relationship to be introduced between the input and the output of the responsive circuit to provide such non-linear output, from, for example, a linear function source.

It is an object of this invention to provide apparatus wherein the sensor (or original function) signal may be corrected either to linearize the signal or to provide a non-linear signal from an originally linear or non-linear signal and to provide an output signal on a digital basis.

It is another object of the invention to provide apparatus capable of receiving an input signal of non-linear character, and of providing an output signal on a digital basis which is the linearized counterpart of the input signal.

More broadly, it is an object of the invention to provide a digital output signal of linear or non-linear character on the basis, respectively, of a non-linear or linear input signal.

Other and further objects are those inherent in the invention herein illustrated, described, and claimed, and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURE 2 is a graph illustrating the results of the use of the invention;

FIGURE 3 is a fragmentary isometric view of a portion of the apparatus shown in FIGURE 1, slightly modified to show a somewhat different form of the invention;

Figure 4:
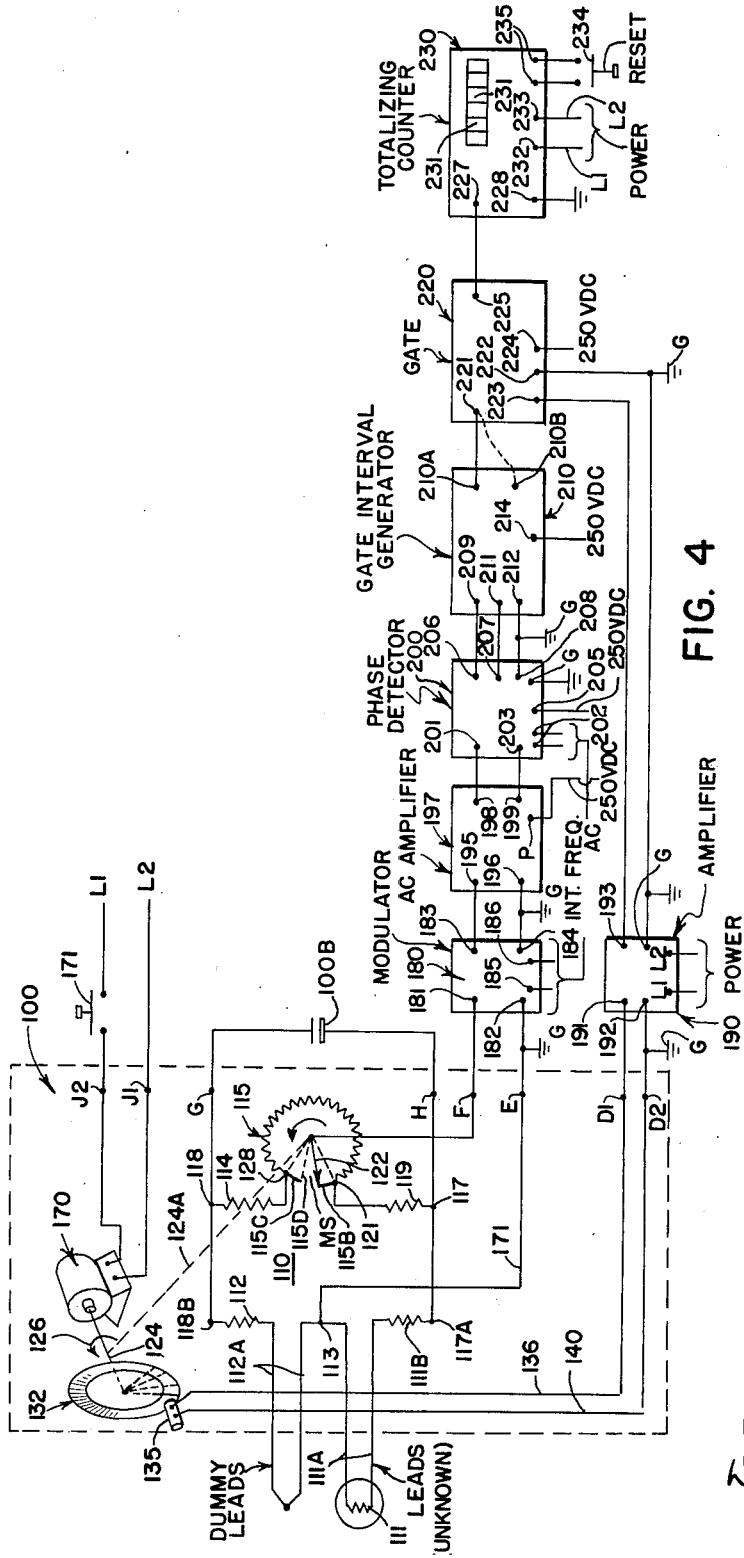
Figure 5B:
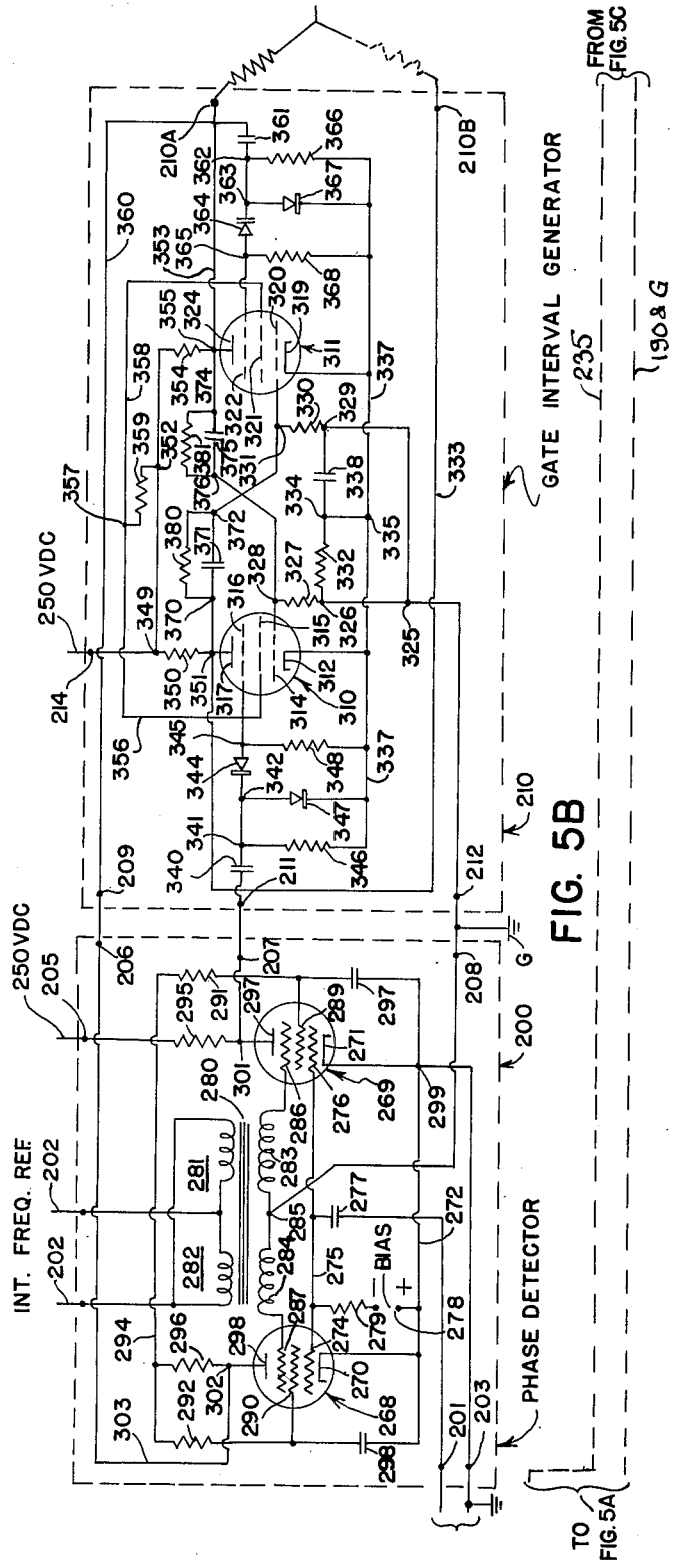
Figure 6:
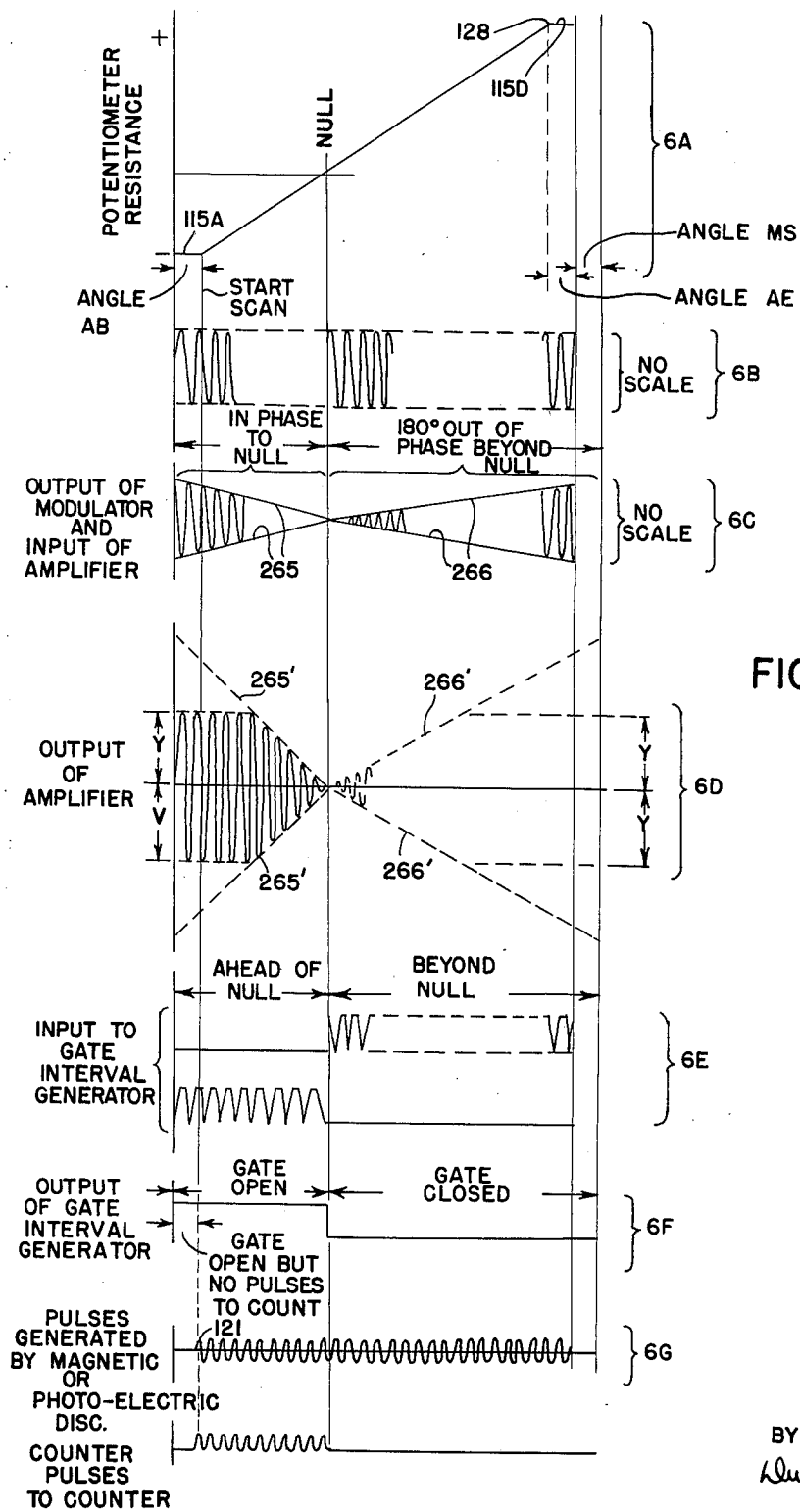

FIGURES 4, 5A, 5B, and 5C, and FIGURE 6, are related, and are schematic representations. FIGURE 4 shows one form of the invention; FIGURES 5A, 5B, and 5C show a slightly modified form of the invention. FIGURE 4 is a wiring diagram showing the various elements in block form; FIGURES 5A, 5B, and 5C are a complete wiring diagram of the apparatus shown in FIGURE 4 with slight modifications. FIGURES 5A, 5B and 5C should be arranged with FIGURE 5A at the left; FIGURE 5B in the middle, and FIGURE 5C at the right;

FIGURE 6 is a related group of graphs designated 6A–6G, inclusive, illustrating the operation of the apparatus shown in FIGURES 4 and 5A–5C;

FIGURE 7 is a schematic view showing the manner in which a plurality of devices are arranged so that they may be read-out by the same basic apparatus.

The exemplification of the invention given herein is made primarily for that situation where it is desired to provide a linearized digital output signal of an originally non-linear signal, but the invention may equally be used in the reverse sense to provide a non-linear digital output signal from a linear input or to provide a non-linear output signal from a different non-linear input.

Figure 1:
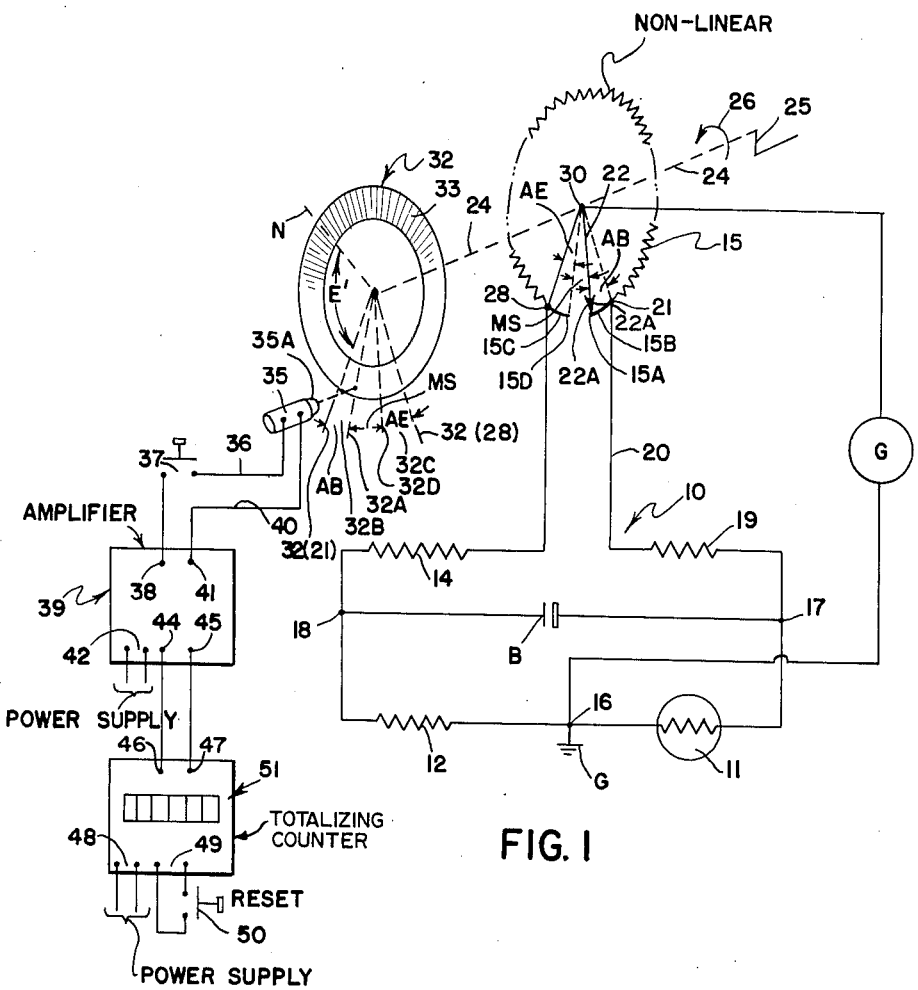
FIGURE 1 is a schematic view, partly isometric, partly exploded, illustrating a simplified and fundamental form of the invention.

Referring to FIGURES 1, 2, and 3, the apparatus comprises a bridge circuit generally designated 10, wherein a resistance thermometer 11 is shown as an example of an input function which is desired to be read, and where the signal is desired ultimately to be converted into a temperature reading. The bridge 10 also contains the resistance elements 12, 14, and a potentiometer 15 and resistance 19. From ground G a circuit extends to junction 16 from which a circuit extends through the (unknown) resistance thermometer element 11 to junction 17.

From junction 16 a circuit also extends through resistance 12 to junction 18. A source of power, exemplified by the battery B is connected between junctions 17 and 18. From junction 17 a circuit extends through the resistance 19 and thence via line 20 to junction 21 on the potentiometer. It will be noted that the resistance element 15 of the potentiometer is arranged in a circular path but does not occupy a complete 360° of arc. Rather, the resistance extends only from the junction 21 to the junction 28, and there may be as much as 20 or 30° of arc between these junctions. For mechanical reasons, there is usually a blank center portion represented by the angle MS (mechanical space), in which no portion of the resistance element or ends thereof can, conveniently, be placed. Contrary to the usual potentiometer, the type utilized in this invention begins with an open end at 15A, and continues along a highly conductive segment 15B to the junction 21, where the resistance actually begins and follows along around the arcuate arrangement of the potentiometer resistance, to the junction 28. Then the potentiometer again continues along a highly conductive segment 15C to the open end 15D. The arcuate length of the segments 15B and 15C, as represented by the angles AB (beginning of the course of travel of the potentiometer wiper arm) and the angle AE (end of the course of travel of the wiper arm), are provided so as to give a space for the acceleration and deceleration of the wiper during its complete rotation since it is desirable that a reasonably constant speed of rotation of the wiper 22 be maintained from junction 21 around to junction 28. Whenever the constant speed is not desired, these end segments 15B and 15C may be minimized or eliminated.

The bridge circuit 10 thus extends from junction 17 through resistance 19 to junction 21 and thence through resistance 15 of the potentiometer to junction 28 and through resistance 14 of the junction 18. The wiper 22 is connected (by a suitable slip ring) at junction 30 through the galvanometer G and thence to junction 16. The wiper 22 rotates in complete and repeated turns. It is brought to rest in the space represented by the angle MS by any suitable stopping mechanism. At the beginning of a turn, the wiper contact 22A runs into contact with the conductive segment 15B and thence after passing junction 21 runs in contact with the potentiometer resistance 15, thence around past junction 28 and then runs out on the conductive segment 15C until it runs off the end thereof into the space MS.

On the shaft 24 there is keyed a disc 32 having (according to one mode of the invention) at least the periphery 33 thereof coated with magnetic material capable of having a magnetic record imposed thereon. The disc rotates relative to a magnetic record pick-up head 35, having an active end 35A. Since the disc 32 rotates (rather than the head), this is in effect a reversal of rotation as compared to the wiper 22 and its cooperating potentiometer 15. Note that the angles AB, MS and AE (on the disc) read oppositely as compared to these same angles on the potentiometer 15.

In FIGURE 1 the pick-up head 35 is shown as separated slightly (to the left) for purposes of clarity in the drawings.

The magnetic disc 32 has no magnetic record between the lines designated 32 (21), which correspond angularly to the position of junction 21 on potentiometer 15, and thence around in a counter-clockwise direction on the disc 32, to the line designated 32 (28), which corresponds to the junction 28 on the potentiometer 15. This (magnetic record) blank space on disc 32 is made up of the sum of the angles AB plus MS plus AE, and corresponds respectively to angular dimension of the conductive segment 15B (labeled 32B for the disc), conductive segment 15C (corresponding to 32C of the disc), and the blank space of the potentiometer represented by the angle MS, likewise represented by the same angle MS on the disc 32. As the disc turns with the shaft 24, it revolves in a counter-clockwise direction with reference to the axis of the pick-up head 35.

The pick-up head is connected via line 36 through normally open push button 37 to input terminal 38 of the amplifier generally designated 39. The opposite terminal of the pick-up head 35 is connected via line 40 to terminal 41 of the amplifier. The amplifier is provided with a power input at 42 and a pair of output terminals 44 and 45, which are connected respectively to the terminals 46 and 47, of a totalizing counter, which can be of any standard make. The totalizing counter is provided with power input terminals 48 and an external reset push button circuit at terminals 49, which are connected through the reset push button 50.

The magnetic "bits" are recorded on the magnetic disc 32 so that as the disc 32 revolves with the shaft 24 and the wiper 22, when the wiper 22 arrives at a certain angular position on the potentiometer 15 (and hence represents a null point in respect to resistance 11), the total number of magnetic "bits" that have passed the magnetic head from the beginning line 32 (21) up to the point of the "null," will be in linear relationship to the temperature imposed upon the resistance 11. This can be done by appropriate calibration and magnetic recording on the disc 32. This, of course, assumes that a digitized linear output is desired corresponding to the non-linear function of resistor 11 and its associated bridge circuit. If some different non-linear digitized output is desired in the read-out counter 51, it is only necessary to record the magnetic bits on disc 32 according to such desired other non-linear function, or if perchance the resistance 11 and its associated bridge circuit should be linear, and a non-linear read-out is desired, this can also be provided by appropriate recording of the magnetic bits on disc 32, according to such desired non-linear function.

Thus referring to FIGURES 1 and 2, in the ideal (but usually unattainable) case, the resistance 11 would be linear in respect to temperature and the resistance 15 would be linear in respect to angle, and hence the angle from the starting point (junction 21) to a particular "null point" would (ideally) vary in linear relation in respect to the total count on the counter 51 as shown by the dotted line L of FIGURE 2. However, this is seldom, if ever, true in practical applications because the resistance 11 is usually non-linear when temperature is plotted against resistance, and because of lack of concentricity of the shaft 24 in respect to the placement circle of resistance 15, and because of (usually) the inherenet non-linearity of the resistance wire in the potentiometer 15. Additional non-linearity errors may be introduced due to other factors. When a "null" point is reached on galvanometer G for any particular temperature, the response curve of the system as a whole may thus be as shown in the solid line "curve" NL of FIGURE 2. Thus, in a practical case, if the magnetic bits were to be recorded linearly on the disc 32, and if a plot of successive temperatures is taken for the resistance element 11, each at a null point for the galvanometer G, there will result a curve such as the non-linear NL in FIGURE 2. The assumed situation makes it desirous that for every temperature there would be a linear relationship in respect to rotation of the shaft 24 and hence of the magnetic disc, and the function would thus be represented by the linear curve L, but in practical apparatus therefore, errors will always be present.

If it is assumed that the temperature responsive resistance 11 is at a certain temperature, when the shaft 24 is roated by means of the handle 25, the galvanometer G will gradually be brought to a null, as represented by the null position, line N in FIGURE 2. On the axis of angles in this graph, the null line is displaced from the true linear position (E) by an "error angle" X. Nevertheless the null occurs at the line N (position E'). Therefore, for purposes of correction, on the magnetic disc 32, beginning at the position 32 (21) and continuing around through the angle E′, to the null line N, there are recorded magnetic bits which have a numerical total proportional to the angle E′ plus the error angle X, that is to say, a total angle from 0 to E′ plus angle X, which is equal to angle 0 to E. This mode of calibration is true for every point along the non-linear curve.

If one considers the ideal linear curve L, and the practical non-linear curve NL of FIGURE 2, it will be noted that the non-linear curve NL digresses further and further from the linear curve L from about the beginning line 32 (21) to approximately point E on the linear scale, and then the two curves run substantially parallel from point E to point G, and then the non-linear curve NL runs back toward the linear curve L from point G until the point of conversion at approximately the line 32 (28). In that portion of the magnetic disc 32, which corresponds to the space from the line 32 (21), (which is the "zero" point on both the linear and non-linear scales), up to approximately the point E on the linear scale, the magnetic "bits" are crowded as compared to what their normal spacing would be for a linear scale and from the position corresponding to the angle E on the linear scale, up to the position corresponding to the angle G, the spacing of the magnetic bits is substantially equal to the normal spacing on the linear scale, since throughout this portion the two curves are running substantially parallel, and from the point G on the linear scale, until convergence of the two curves at line 32 (28), the magnetic bits are spaced apart more widely than for the normal spacing of a linear scale.

Hence, in a general case, the magnetic "bits" are crowded when the non-linear graph digresses from the linear graph and are spaced normally where the graphs run parallel and the spacing is expanded where the graphs run toward each other. Also, the sum of the bits from start equals the ideal (linear) total at any selected stopping point (null).

Now, the converse of this situation can also be attained, as where it is desired to generate a non-linear function from a linear function. Assuming that the input signal is graph L, and it is desired to exhibit an output signal according to graph XL, it is then only necessary to record the magnetic bits on disc 32 accordingly, or where the input is a non-linear graph L and it is desired to provide an output according to graph XL, the magnetic bits would be recorded according to the latter where the error at null is angle Y. The latter situations are more commonly encountered where it is desired to accomplish mathematical operations on incoming signal data.

Therefore, in its broadest sense, the invention provides a digital output according to a predetermined linear or non-linear functional basis from incoming linear or non-linear signals.

Therefore, referring to FIGURE 1, the operator will push the reset button 50, which therefore resets the totalizing counter 51 to the zero position. Then, while holding the push button 37 closed, the operator turns the handle 25 at, preferably, a substantially uniform rate until the galvanometer G reaches null, whereupon the push button 37 is released, and the turning is continued until the wiper 22 is brought into the space represented by the angle MS. The magnetic bits on drum 32 record from the beginning represented by junction 21 on the potentiometer 15 (line 32 (21) of FIGURE 2), around to the null point, line E′ of FIGURE 2 (where push button 37 was opened), and although (pre-recorded magnetic) signals are picked up by the pick-up head 35 beyond the null (line E′, FIGURE 2), such signals do not get through to the totalizing counter 31 beacuse switch 37 is opened. Hence (in the assumed non-linear to linear case), the totalizer shows a corrected (linearized) value in which all non-linearity errors are compensated.

In FIGURE 3, the apparatus insofar as concerns the shaft 24, potentiometer 15, and the external read-out circuits, is the same as in FIGURE 1, except that instead of a magnetic disc 32 and cooperating magnetic pick-up head 35, there is provided a photo-electric sound track on disc 60 together with an appropriate photo-electric system. Thus light from the lamp 61 is concentrated in the lens system 62 so that it is a beam of light 64, which passes through the sound track 66 on the disc 60 and thence falls upon the photo-electric cell 65. The sound track around the portion of the disc from the line 32 (21) clockwise to the line 32 (28), is the photo-electric equivalent of the magnetic sound track on the disc 32, between the corresponding lines. The operation of the system when using a photo-electric pick-up, as shown in FIGURE 3, is the same as with that shown in FIGURES 1 and 2.

Referring now to FIGURES 4, 5A, 5B, 5C, and 6, in FIGURE 4, where the elements are corresponding to those in FIGURE 1, the numbers designating such elements are simply made one hundred units higher. FIGURE 4 includes unit 100, which is a chassis in which the potentiometer is generally designated 115 (corresponding to 15 of FIGURE 1); the magnetic (or photo-electric) disc is 132 (corresponding to 32 or 60 of FIGURES 1 and 3), the bridge circuit generally designated 110 (corresponding to bridge 10). These and other various elements are mounted as a compact unit on the chassis 100. The chassis also includes a motor 170 which can have its own internal gearing to its output shaft, and appropriate terminals for external circuits.

The chassis 100 is preferably made as a plug-in unit or as a unit that can be switched in at its terminals. Thus, the chassis 100 has terminals J1 and J2 which are connected to motor 170, and on the external side are connected through push button switch 171 to power lines L1 and L2. When the push button 171 is closed, the motor rotates in the direction of arrow 126. The shaft 124 rotates the disc 132 with reference to the pick-up head 135, which is connected by leads 136 and 140 to terminals D1 and D2, respectively, of the chassis, 100.

The bridge circuit 110, has its terminals 117 and 118 connected respectively to the terminals H and G which are externally connected to the battery 100B. The bridge 110 is similar to the bridge 10 of FIGURE 1, it being noted that a circuit extends from terminal 117 through the resistor 119 to terminal 121 on the potentiometer resistor 115, and thence through that resistor to its terminal 128 and through resistor 114 to terminal 118. The wiper 122 of the potentiometer resistor is connected to chassis terminal F. From terminal 117, the circuit also extends to the terminal 117A and thence through the resistor 111B and through the leads 111A to the temperature responsive resistor 111, and thence to terminal 113 which is connected via line 171 to chassis terminal E. This terminal is connected to an externally grounded line. From bridge junction 170, the circuit extends through the "dummy" leads 112A and the resistor 112, and thence through junction 118B to junction 118. The dummy leads 112A and the leads 111A to the external resistor are preferably made identical and are preferably in the same shielded cable so as to be subject to the same conditions.

The potentiometer 115 is constructed identically with that described with reference to FIGURE 1, and has start tab 115B and end tab 115C, both of negligibly low resistance.

Externally, the chassis 100 has terminals E and F connected to a modulator 180 having input terminals 181 and 182, output terminals 183 and 184 and supply terminals 185 and 186 which are connected to a source of intermediate frequency alternating current supply. This frequency is a matter of choice; 40 kc. gives good results but lower or higher frequnecies can be used. In general, the faster the potentiometer wiper 22 is turned, the higher the frequency. Terminal 181 is connected to terminal F; terminal 182 is connected to terminal E, and this connection is grounded at G. Terminals D1 and D2 of the magnetic pick-up circuit are connected respectively to the terminals 191 and 192 of an amplifier 190 which has power supply terminals L1 and L2 and output terminals G and 193. The modulator is any selected device which will convert a gradually changing D.C. voltage (input) signal which passes through a zero voltage (null-point) into a usable A.C. output. For example, there may be used a diode ring modulator which provides as its output an A.C. voltage which gradually diminishes in amplitude as the D.C. signal approaches zero voltage and then changes phase at such zero voltage (null point) and then gradually builds up amplitude as the D.C. signal increases in opposite sign. Such diode modulator is a known device, and is hereinafter more fully described.

The output terminals 183 and 184 of the modulator are connected respectively to the terminals 195 and 196 of the alternating current amplifier generally designated 197, having output terminals 198 and 199, which are respectively connected to input terminals 201 and 203 of the phase detector generally designated 200. The alternating current amplifier 197 also has a supply terminal P (connected to a source of direct current, as for example, 250 volt D.C.). The phase detector has A.C. input terminals 202—202 which are connected to the same intermediate frequency reference source which supplies terminals 185 and 186 of the modulator. The phase detector also has a supply terminal 205 (connected to a source of direct current, as for example, 250 volt D.C.), a ground terminal G, and three output terminals at 206, 207, and 208, which are connected respectively to the input terminals 209, 211, and 212, of the gate interval generator generally designated 210. The connection between terminals 208 and 212 is grounded at G. In this exemplification of the invention, the modulator produces a phased output signal, which is amplified. The gate interval generator senses this (as well as the beginning and end of the signal cycle), to provide an "interval" signal. Any suitable circuit for this purpose can be used. The gate interval generator has an output terminal 210A and another (alternative) output terminal 210B, only one of which is used at any one time. The gate internal generator also has a supply terminal 214 (connected to a source of direct current, as for example 250 volt D.C.). It may be stated parenthetically that the gate interval generator provides a signal on one of its terminals (210A or 210B) which begins sharply at the start of the scanning cycle and ends sharply when the null point is reached, and on the other terminal there is no signal until the null point is reached whereupon a signal sharply begins and continues to the end of the scanning cycle, and during this latter period the signal on the first terminal is zero. Only one signal (i.e., that which begins with the start of the cycle and ends at the null point) is useful, the other being wasted. Which terminal (210A or 210B) is used depends upon the connections made at terminals 202; merely reversing the supply at these terminals will make the signals at 210A and 210B exchange places. This can also be accomplished by reversing the supply on terminals 185 and 186 of the modulator 180. However, for any one set of connections of the intermediate frequency on any current to the terminals 185–186 and 202—202, a certain signal will be provided on the gate interval generator terminals 210A and 210B. The signal which is desired is then selected from one of these terminals and the other is disregarded.

At 220 there is provided a gate having gate input terminal 221, the signal input terminals 222 and 223, and a supply terminal 224, to which a suitable direct current supply is introduced, as for example, 250 volt D.C. is connected. The output terminal of gate 200 is at 225. The gate pulse-signal input terminals 223 and 222 are connected back to the terminal 193 and G, respectively, of the amplifier. It will be recalled that the amplifier is connected to the magnetic pick-up coil 135 and is responsive to the rotation of the magnetic disc 132 (or photo-electric or other equivalent). When a certain gate interval signal is impressed upon terminal 221, the gate 220 will "open" and permit the signal pulses received on its terminals 223–222 (from amplifier 190), to be transmitted through the "gate" to the output terminal 225 which is connected to the input terminals 227 of the totalizing counter 230. This totalizing counter is of any commercially available type having a sufficient number of digits so as to be suitable for the particular counting that is desired. These digits are displayed as a number of figures in windows 231. Power supply from lines L1 and L2 is connected to the input terminals 232 and 233. The "reset" button 234, which is external, is connected to the reset terminals 235, and the device is grounded at terminal 228.

In brief the operation of the FIGURE 4 exemplification is as follows: The push button 234 is pushed so as to reset to "zero" the reading displayed at window 231. Push button 171 is then closed for a short time at least sufficient for one revolution of motor 170. Precaution is taken that the motor wiper 122 of the potentiometer begins its motion at some position within the angle MS between the open ends 115B and 115D of the potentiometer resistor segments. The potentiometer wiper 122 thus starting picks up speed during the course of travel over contact segment 115B and makes one complete revolution, and push button 171 is released as the wiper reaches segment 115C and the wiper 122 slows down and stops in space MS.

In doing this, at some one angular position the wiper 122 will be at the same voltage as junction 113. The resultant output signal at the terminals E and F will begin as a negative voltage (when the wiper is on segment 115B) and the signal will gradually decrease to zero voltage (null point) at some position of wiper 122 on resistor 115, and then gradually increase in an opposite sense to a maximum when the wiper is on end segment 115C. A graph of this voltage pattern is shown at 6A in FIGURE 6.

The wiper 122 thus varies from a negative voltage through zero voltage, which corresponds to the null point, to a certain positive voltage. During the period that the shaft 124 rotates from the negative voltage position (corresponding to the negative voltage at junction 121), and thence through the null point, the transmitter composed of the disc 132 and the pick-off coil 135, transmits a number of pulses, which are amplified by the amplifier 190 imposed upon the terminals 223–222 of the gate 220.

According to the present invention, the gate is "open" (i.e., conductive) at the beginning of the cycle, but signal pulses from the disc 132 and head 135 do not begin until wiper 122 reaches the junction 121. The gate remains "open" continuously until the null point is reached, whereupon the gate is abruptly "closed" (i.e., it becomes nonconductive). The function of the disc 132 and pick-up element 135 (or photo-electric or other equivalent) is meanwhile to begin a transmission of pulses at an angular position corresponding to that position of the shaft when the wiper 122 is at junction 121, and to transmit a sufficient number of pulses up to the null point, so that the number of pulses will constitute a certain count, the number of digits of the count being in linear relation to the function which is sent by the resistance 111 (which may be a function such as temperature). Therefore, the number of pulses picked up by the pick-up coil 135, amplified through the amplifier 190, and transmitted through the gate 220 (so long as the gate is "open") are totalized as "counts" on the counter mechanism 230, and the number bears a linear relation to the temperature (or other function).

It is the purpose of the circuitry between the terminals

EF and 210A–210B to manipulate the opening and closing of the gate so that the pulses (which are linearly corrected in respect to the function being sensed), will be counted from the beginning of the cycle, up to the "null point," which is the "reading" desired to be sensed. Many different circuits can be used for this. The circuitry herein exemplified is a preferred embodiment.

FIGURES 5A, 5B, and 5C, illustrate the circuitry for FIGURE 4, plus several additional features. In these figures, the modulator 180 is a diode ring modulator of standard form, the circuits of which are in FIGURE 5A. Thus there are a plurality of diode elements 241, 243, 245, and 247, which are connected in loop circuit, with junctions at 242, 244, 246, and 248 between the adjacent diodes. Junctions 242 and 246 are connected to the secondary 249 of the transformer 250 having a primary 251 and a center tap 252 on the secondary. The primary 251 is connected to the input terminals 185 and 186 of an intermediate frequency alternating current such as 40 kilocycles A.C. The diode ring junctions 244 and 248 are connected to the secondary 253 of the transformer 254 having a primary 255 and a secondary center tap 256. The secondary center tap terminals 252 and 256 are connected respectively to the modulator input terminals 181 and 182 from bridge circuit 110. It will be noted that input terminal 181 connects to terminal F of the module 100, which is in turn connected to the wiper 122 of the potentiometer rheostat 115. Terminal 182 is connected to terminal E which is in turn connected to the Wheatstone bridge terminal 113. Terminals 182 and E and the circuit connecting them are grounded at G. The connections between terminals E–182 and F–181 are preferably by shielded cable SC, which is also grounded.

The output terminal 183 of the modulator is connected through junction 256 and condenser 257 and junction 258 to the winding 255 of transformer 254, the opposite terminal of said winding being connected through junctions 259 and 260 to output terminal 184 of the modulator. Condenser 261 is connected between junctions 258 and 259, and resistor 262 is connected between junctions 256 and 260.

Output terminal 184 of the modulator is connected to ground G and to the input terminal 196 of a multi-stage alternating current amplifier, generally designated 197. Terminal 183 of the modulator is connected to the input terminal 196 of the amplifier 197. The amplifier is of standard type, having a power input terminal P (250 v. D.C.), and output terminals 198 and 199, the latter being grounded. Above the bracket 264 there is provided an overload circuit, composed of diodes serially connected in two banks of opposite polarity. These diode banks are connected between the grid input of the last stage tube of amplifier 197 and ground. The result is that for a certain maximum signal input on the grid of the last tube, the diodes will tend to conduct, thereby holding the grid input signal of the last tube to a certain value, thereby preventing overload of that stage.

Referring to the two graphs 6B and 6C of FIGURE 6, graph 6B represents the intermediate frequency, such as 40 kilocycles A.C., which is impressed upon the modulator 180. This is of constant amplitude and is constantly impressed upon the modulator. It is the effect of the modulator 180, that as the direct current signal input (graph 6A) impressed on its terminals 181–182 gradually increases (i.e., decreases towards zero and then increases in an opposite sense beyond zero, as in graph 6A), the output voltage of the modulator between terminals 183 and 184 will gradually decrease according, for example, to the slope lines 265, until the null point (zero voltage D.C. input to the modulator) is reached, and after the null point of the input D.C. voltage is reached, and begins to go positive, the A.C. voltage of the modulator will again rise according to the slope lines 266, to maximum voltage at the end of the cycle. The modulator 180 has also this property: That in that portion of the cycle from the (negative voltage) beginning, and thence up to the null point, the output A.C. voltage of the modulator terminals 183–184 will be in phase with the intermediate frequency reference input voltage, but from the null point to the end of the cycle, output voltage will be 180° out of phase with the reference (input) voltage. Thus, up to the null point, the output between the terminals 183 and 184 will gradually decrease in amplitude and be in phase with the intermediate frequency reference, and immediately upon reaching the null point, and thereafter beyond the null point to the end of the cycle, the output signal voltage will be out of phase and will gradually increase to maximum amplitude. The modulator thus provides a sharp phase shift (180°) at the null point.

The alternating current amplifier faithfully reproduces the modulator output signal as shown in graph 6D of FIGURE 6, except that due to the action of the regulator circuit shown over the bracket 264, there is an amplitude restriction at amplitude Y. This restriction remains effective until the amplitude begins to decrease (below the restriction value) along the slope lines 265′, in which region the input voltage on the last tube of amplifier 197, is below the voltage at which the regulator 264 has any effectiveness, and then after the null point is reached, the voltage actually builds up again along the slope lines 266′ until the maximum amplitude of Y is reached again, whereupon the amplitude stays constant at this amplitude to the end of the cycle. Here again, it should be remembered that in that portion of the cycle from the beginning until the null point the output of the amplifier will be in phase with the intermediate frequency reference impressed upon the modulator input terminals 185–186, and will be out of phase with the reference during that portion of the cycle from the null point to the end of the cycle.

It is the function of the phase detector 200 to tell when the amplifier output signal is in phase or out of phase, and to provide an appropriate output signal to the gate interval generator 210 corresponding to such phase relationship. The phase detector accordingly uses two multi-grid amplifier tubes 268 and 269. These tubes are connected symmetrically and have cathodes 270–271, each connected to the cathode bus 272. Each of these tubes has a first control grid. Thus the first control grid 274 of tube 268 is connected to the first-grid bus 275, and the control grid 276 of the tube 269 is connected to such bus. The amplifier output terminal 199 connects to the input terminal 203 of the phase detector. The amplifier output terminal 198 connects to the input terminal 201 of the phase detector which is in turn connected through condenser 277, to the first-grid bus 275. The first grid bus 275 is maintained negative by means of the bias cell 278 which connects through resistor 279 to said bus.

The phase detector also includes a transformer generally designated 280 having dual primary windings 281 and 282 connected in parallel to the input terminals 202—202, and two secondary windings 283–284 which are serially connected through junction 285. The remote end of the winding 283 is connected to a second control grid 286 of the tube 269, and the remote end of the winding 284 is connected to the second control grid 287 of the tube 268. Screen grids 289 of tube 269 and 290 of tube 268 are connected respectively through resistors 291 and 292 to line 294, and this line is connected through resistors 295 and 296 to respectively the plates 297 and 298 of the tubes 269 and 268, respectively. The same grids 289 and 290 are connected through condensers 297 and 298, respectively, to the cathode bus 272. Junction 299 of the cathode bus 272 is connected to the input terminal 202 which is grounded.

The anode 297 of tube 269 is connected at junction 301 to the output terminal 207 of the phase detector and anode 298 of tube 268 is connected at junction 302 and via line 303 to the alternate output terminal 206 of the phase detector.

The function of the phase detector is this: The tube 268 will become conductive when the first and second control grids of said tube become positive, but will remain non-conductive so long as either grid remains negative. The same is true for tube 269. The fact that the intermediate frequency reference voltage is applied via transformer 280 upon the second control grid of each tube, means that at a certain time during each cycle of the intermediate frequency, one or the other of the tubes 269 will be potentially conductive (and the other non-conductive) if the first control grid of the potentially conductive tube is also positive. If, during this potentially conductive period of one of the tubes, the input voltage on the phase detector as received from the A.C. amplifier should also be positive, conductivity of the tube will occur. However, should either the phase of the input signal from the A.C. amplifier or the phase of the reference voltage of intermediate frequency reference be negative, the tube 268 (or 269) will not be conductive.

In general, it can therefore be said that during that portion of the travel of the potentiometer wiper arm 122, from the beginning of the cycle to the null point, the phase of the signal output from the modulator 180 (and hence from the amplifier 197) will be in phase with the intermediate frequency reference voltage and that during this period either one of the other of the tubes 268 and 269 will be conductive. In the graph designated 6E, there are two curves, one above the other, wherein the upper curve remains non-conductive from the start of the cycle to the null point, and the lower curve is conductive during this period. The pips of conductivity are intended to be indicated in phase with the signal output of the A.C. amplifier, graph 6D up to the null point, and out of phase thereafter. At the null point, that tube which has been conducting thereafter abruptly becomes non-conductive, and the other tube becomes conductive. This relationship of conductivity to non-conductivity can be interchanged as between the two tubes of the phase detector by merely interchanging the connections of the intermediate frequency reference supply lines on terminals 202—202. For convenience two output terminals 206 and 207 are shown, and these are connected over to the gate interval generator, and the signal utilized as will now be explained.

Referring to FIGURE 5B, the gate interval generator has two multiple-grid tubes generally designated 310 and 311. Tube 310 has the catthode 312, a first controlled grid 314, screen grid 315, and a second control grid 316, and an anode 317. The tube 311 has a cathode 319, a first control grid 320, screen grid 321, a second control grid 322, and an anode 324. From the ground terminal 212 of the gate interval generator, a circuit extends to junction 325 and thence via junction 326 and resistor 327 and junction 328 to the first control grid 314 of tube 310. From junction 325 a circuit extends through junction 329, resistor 330, and junction 331 to the first control grid 320 of the tube 311. Junction 326 is connected via resistor 332 to junction 334, and thence to junction 335, on the cathode bus 337. From junction 334 a circuit extends through condenser 338 to junction 329. Junction 334 is connected to junction 335 on the cathode bus 337.

From signal input terminal 211, a circuit extends through condenser 340 and junctions 341 and 342, and thence through diode 344 and junction 345 to the second control grid 316 of tube 310. Junction 341 is connected through resistor 346 to the cathode bus 337; junction 342 is connected through the diode 347 to the cathode bus 337, and junction 345 is connected through resistor 348 to the cathode bus 337. Direct current supply, as for example 250 volts, is applied to terminal 214 which is connected through junction 349 and resistor 350 to junction 351 and thence to anode 317 of tube 310. From junction 349 a circuit extends through junction 352 and resistor 354 to junction 355, and thence to the anode 324 of the tube 311. A connection extends from screen grid 315 of tube 310, thence via line 356 to junction 357 and thence via line 358 to the screen grid 321 of the tube 311. Resistor 359 is connected between junctions 352 and 357.

Similarly, a circuit extends from the gate interval input terminal 209 via line 360 and thence through condenser 361, junction 362, junction 363, diode 364, junction 365, to the second control grid 322 of the tube 311. Junction 362 is connected via resistor 366 to the cathode bus 337; junction 363 is connected via diode 367 to the cathode bus 337; and junction 365 is connected via resistor 368 to the cathode bus 337.

From junction 351 (at the anode 317 of tube 310) a circuit extends via junction 370 and through condenser 371 to junction 372 and thence to junction 331 on the first control grid 320 of tube 311. Similarly, a circuit extends from junction 355 (at the anode 324 of tube 311) through junction 374, condenser 375, junction 376, to junction 328 on the first control grid 314 of the tube 310. Resistor 380 is connected in parallel with condenser 371 and resistor 381 is connected in parallel with condenser 375.

Anode 317 (of tube 310) is connected via junction 351 and line 353 to output terminal 210B. Anode 324 (of tube 311) is connected via junction 355 and line 353 to output terminal 210A.

Referring to FIGURE 6, and particularly to the graph 6E, it will be noted that in that portion indicated "ahead of null" that one of the curves (the upper one) shows no input voltage whereas the other curve (the lower one) shows repeated "pips" of input voltage. This situation abruptly interchanges at the null point, as between the two graphs. It may be stated parenthetically that these graphs represent the voltages applied to the terminals 209 and 211, but they are not designated specifically on graphs 6E, since the voltages at the two terminals 209 and 211 can be interchanged, as previously stated, by simply interchanging the leads of the intermediate frequency reference at the terminals 203 and 204 of the phase detector. That one of the terminals which shows voltage pips ahead of the null point, is the active terminal up to the null point and the other terminal is the active terminal after the null point. The gate interval generator works as follows:

Assuming that neither tube 310 or 311 is conducting, a positive voltage signal is received on input terminal 209 and is communicated to the grid 322, causing the tube 311 to become conductive. The conductivity of this tube raises the voltage at its anode output terminal 355 which is connected to the output terminal 210A and it is also connected via junctions 374, condenser 375 and resistor 381, junction 376 to junction 328 on the first control grid 314 of the tube 310, with the circuit continuing from junction 328 to resistor 327, junction 326 to junction 325 and to ground terminal 212. The effect of this is that grid 314 of tube 310 is driven more neagtive and the tube 310 hence is maintained non-conductive. The conductivity of the tube 311 causes an abrupt rise of voltage at the terminal 210A, which is indicated at the beginning of the cycle in the graph 6F in FIGURE 6. The repeated input pulses received at terminal 209, from the beginning of the cycle, up to the null point, repeatedly influences the tube 311 to continue what it is already doing, namely to conduct, and continuously influences the tube 310 to be non-conductive.

This situation abruptly changes when terminal 209 ceases to receive input signals, and terminal 211 begins to receive input signals, which effect occurs at the null point, as indicated in graph 6E of FIGURE 6. When this occurs, the signal on terminal 211 is communicated to the grid 316 of the tube 310, and this tube therefore begins to conduct, thereupon causing a voltage to appear at its anode output terminal 351. This voltage is the signal applied to the terminal 210B of the gate interval generator. The signal at this terminal is wasted, but the correlative effect of the status of conductivity of tube 310 is not wasted, since when tube 310 conducts, its anode voltage at 351 is communicated via junction 370, condenser 371 and resistor 380 thence to junction 372, and junction 331 to the first control grid 320 of the tube 311, with the circuit also extending from the junction 331 via resistor 330 and junction 329 and junction 325 to the ground terminal 212. This causes the tube 311, which previously had been conductive, to abruptly assume a state of non-conductivity, this ends the (gate "open" interval) voltage wave at the null point, as indicated in graph 6F of FIGURE 6.

The gate 220 includes one tube generally designated 390 having a cathode 391, first control grid 392, screen grid 393, second control grid 394, and anode 395. From D.C. supply at 224, a circuit extends through junction 396, 397, and resistor 398, junction 399, junction 400, resistor 401, to ground terminal 222. A condenser 402 is connected between junctions 399 and 222. From junction 396, a circuit extends through resistor 404 and junction 405 to the anode 395 of the tube 390. From junction 397 a circuit extends via resistor 409 to the screen grid 393. The first control grid 392 is connected directly to the signal input terminal 221. The second control grid 394 is connected to junction 406 and through condenser 407 to signal pulse input terminal 223. The resistor 403 is connected between junctions 400 and 406.

When a positive (gate "open") signal is received upon grid 392, tube 390 will become conductive, provided at the same time a positive ("count pulse") signal is received upon the second control grid 394. It will be remembered that the terminals 222 and 223 are connected to the ground terminal G and pulse signal output terminal 193 of the amplifier 190, which has its input connected to the pick-up coils 135 which cooperates with the magnetic disc 132. Accordingly, while the wiper arm 122 of the potentiometer is rotating from the beginning of the cycle up to and through the null point to the end of the cycle, the magnetic disc (or the equivalent photo-electric disc) has likewise been rotating and a plurality of signal pulses are sent through the amplifier 190 and these are applied across the terminals 222 and 223. These pulses are generated as illustrated in the graph 6G in FIGURE 6. It will be noted that the pulses are not generated at the beginning of the cycle, which corresponds to the time when the potentiometer wiper 122 just engages the end 15A of the conductive strip 15B of the potentiometer 15. Accordingly, at the beginning of the cycle, the gate 220 has been opened, as shown in graph 6F, but at this time, no pulses are being received upon terminal 223 of the gate, and hence tube 390 is non-conductive. As the wiper 122 of the potentiometer reaches junction 121 of the potentiometer, which is the beginning of the resistance portion of the potentiometer, the magnetic (or photo-electric) disc 132 will begin to send pulses, as indicated at the line 121 of graph 6G, FIGure 6. The wave form of the pulse count voltage (applied to terminal 223) is determined by the operation of the magnetic (or photo-electric) transmitter apparatus 132–135 (or 65–66), in cooperation with the amplifier 190, and is not necessarily sinusoidal, but it is an alternating voltage. Therefore, every time that the pulse wave becomes positive, and assuming grid 392 is also positive, the tube 390 of gate 220 will become conductive, and these conductive "count pulses" are then permitted to pass through the "gate" 220 and appear as pulses (counts) on the output terminal 225.

The counter 230 is conventional and has a plurality of rotating wheels in decimal relationship. These are displayed through the window 230A. The signal input from the gate terminal 225 is applied directly to the input terminal 227. Power is supplied at terminals 232 and 233; the counter is grounded at 228, and is provided with a reset circuit terminal 235. Therefore, so long as the gate 220 is "open" under the influence of a positive voltage (see graph 6F), applied via terminal 221 to grid 392 of tube 390, any "count" pulses produced by the magnetic (or photo-electric) disc will be passed. When the gate tube 390 becomes non-conductive (at and after the null point), due to the abrupt sensation of negative voltage on input terminal 221 (see graph 6F, FIGURE 6), the tube 390 of the gate will become abruptly non-conductive and will pass no more "count pulses" that are supplied to the terminal 223, even though the disc 132 continues to rotate in connection with the potentiometer, and even though the signals are amplified and applied to the terminals 222-223 of the gate.

In FIGURES 5A, 5B, and 5C, there is provided an external reset circuit for the counter 230. This reset circuit extends through the manual reset button 234, and is also wired back through the leads 235 to a parallel reset switch 234A, which is a micro-switch operated by a cam 234B and cam roller 234C mounted upon the shaft 124 which carries the potentiometer 15 and the magnetic (or photo-electric) disc 132. The cam 234B is keyed on the shaft 124 in such a position that its cam lobe will close the switch 234A momentarily just after the wiper arm 122 has run off the conductive portion 15C of the potentiometer and into the blank space MS. Accordingly, for each complete revolution of the potentiometer, the apparatus provides a digital display at the counter 230 and this is maintained until the potentiometer has completed one full revolution and is ready to begin again. The cam lobe on cam 234B is made short enough so that switch 234A is open by the time the micro-arm 122 again contacts the end 15A of the conductive strip portion 15B of the potentiometer 15.

The apparatus shown under the bracket 100 in FIGURE 5A essentially converts the undesired function, for example, the non-linear function of a resistance probe, or other signal input, to a desired function, example, a linear function, or vice versa, and provides a pulse signal, of which the number of pulses at any null point around the sweep of potentiometer is indicative of the desired, example; linearized, value corresponding to the undesired, example; non-linear, function. Any number of such devices 100, may be supplied, and by appropriate switching apparatus, not shown, can be individually connected to the read-out apparatus leading to the digital display at counter 230.

The signal at terminals E and F of the bridge circuit 100, as shown in graph 6A in FIGURE 6, begins at a negative value and sweeps through null to a positive value. This voltage pattern of signal may be amplified and used directly on a polarized relay, which is then substituted for the gate 220, said polarized relay being effective to close the gate circuit so long as the signal according to the graph 6A is negative, and abruptly open the gate circuit so long as the signal is positive. Such simplified circuitry is satisfactory for slow speed operation, but is less satifactory for our high speed operations. This simplified version of gate is illustrated at 420 in FIGURE 7. In this figure, relay 420 has a coil 421 and a single normally open contact 422 which is closed so as to complete a circuit between its terminals 423 and 424 whenever a negative voltage is applied to the coil 421, but which opens abruptly whenever the voltage applied to the coil 421 is zero or positive. The relay coil 421 has terminals 425 and 426 which are connected directly, or optionally through an amplifier (not shown), to the terminals E and F of potentiometer unit 100 and in such a way that the coil 421 will cause the contact 422 to close when the negative voltage as shown in graph 6A is applied from the beginning of the cycle up to the null point, and will open the relay contact 422 when the voltage becomes zero or positive. Relay terminal 422 is connected to output terminal 193 of the amplifier 190 and relay terminal 424 is connected to the counter terminal 227. The ground lead G of the amplifier is connected straight through to the counter terminal 228.

As many widely apparently different embodiments of this invention may be made without departing from the spirit and scope thereof, it is to be understood that we do not limit ourselves to the specific embodiments herein.

What we claim is:

1. The system comprising a signal sensor for providing a sensor signal which varies non-linearly in respect to the function being sensed from a low reference value to a high reference value, a comparator circuit for providing a comparator signal, said circuit including means for varying said signal from said low reference value to said high reference value, comparator means in said comparator circuit and connected to said sensor for sensing when the signal of the comparator circuit equals the sensor signal, a pulse generator connected to said means for varying said comparator circuit so as to be operated coincidentally therewith for transmitting pulses from the time the comparator signal varies from said low reference value to said high reference value, the number of pulses generated from the time the comparator signal equals said low reference value until it reaches the value of said sensor signal being proportional to the value said sensor signal would have if the sensor signal and comparator signal each varies linearly from said low reference value to said high reference value, a pulse counter and gate means for connecting the pulse counter to the pulse generator from the time the comparator signal is at said low reference value until the comparator signal equals said sensor signal, said gate means including a gate control system connected to the comparator circuit so as to be operated thereby, said gate control system including a modulator connected to the comparator circuit and to an A.C. reference for providing an output signal in phase with the A.C. reference when the comparator signal has a value between said low reference value and when it equals said sensor signal and for providing an output signal out of phase with said A.C. reference when the comparator signal has a value between said sensor signal value and said high reference value.

2. The system comprising a signal sensor for providing a sensor signal which varies non-linearly in respect to the function being sensed from a low reference value to a high reference value, a comparator circuit for providing a comparator signal, said circuit including means for varying said signal from said low reference value to said high reference value, comparator means in said comparator circuit and connected to said sensor for sensing when the signal of the comparator circuit equals the sensor signal, a pulse generator connected to said means for varying said comparator circuit so as to be operated coincidentally therewith for transmitting pulses from the time the comparator signal varies from said low reference value to said high reference value, the number of pulses generated from the time the comparator signal equals said low reference value until it reaches the value of said sensor signal being proportional to the value said sensor signal would have if the sensor signal and comparator signal each varies linearly from said low reference value to said high reference value, a pulse counter and gate means for connecting the pulse counter to the pulse generator from the time the comparator signal is at said low reference value until the comparator signal equals said sensor signal, said gate means including a gate control system connected to the comparator circuit so as to be operated thereby, said gate control system including a modulator connected to the comparator circuit and to an A.C. reference for providing an output signal in phase with the A.C. reference when the comparator signal has a value between said low reference value and when it equals said sensor signal and for providing an output signal out of phase with said A.C. reference when the comparator signal has a value between said sensor signal value and said high reference value, said gate control system also including a square wave generator connected to said modulator output for generating a substantially square front and square end wave of substantially constant amplitude which begins no later than the time the comparator signal equals the low reference value and ends when the comparator signal and sensor signal are equal.

References Cited by the Examiner

UNITED STATES PATENTS

| | | | |
|---|---|---|---|
| 2,428,990 | 10/47 | Rajhman. | |
| 2,631,778 | 3/53 | Piper et al. | 340—347 |
| 2,685,082 | 7/54 | Beman et al. | 235—154 X |
| 2,781,970 | 2/57 | Kaufman | 235—154 |
| 2,999,965 | 9/61 | Airey | 340—347 |

MALCOLM A. MORRISON, *Primary Examiner.*

CORNELIUS D. ANGEL, *Examiner.*